(12) United States Patent
Bojaxhi et al.

(10) Patent No.: US 8,850,585 B2
(45) Date of Patent: *Sep. 30, 2014

(54) SYSTEMS AND METHODS FOR AUTOMATED MALWARE ARTIFACT RETRIEVAL AND ANALYSIS

(75) Inventors: Hermes Bojaxhi, Columbia, MD (US);
Joseph Drissel, Columbia, MD (US);
Daniel Raygoza, Baltimore, MD (US)

(73) Assignee: Cyber Engineering Services, Inc., Columbia, MD (US)

( * ) Notice: Subject to any disclaimer, the term of this patent is extended or adjusted under 35 U.S.C. 154(b) by 174 days.

This patent is subject to a terminal disclaimer.

(21) Appl. No.: 13/607,789

(22) Filed: Sep. 9, 2012

(65) Prior Publication Data

US 2013/0263266 A1    Oct. 3, 2013

Related U.S. Application Data

(63) Continuation of application No. 13/434,311, filed on Mar. 29, 2012, now Pat. No. 8,291,500.

(51) Int. Cl.
*H04L 29/06* (2006.01)
*G06F 21/55* (2013.01)

(52) U.S. Cl.
CPC ......... *H04L 63/145* (2013.01); *H04L 2463/144* (2013.01); *G06F 21/552* (2013.01)
USPC ............................................ 726/24; 713/188

(58) Field of Classification Search
CPC ............ H04L 63/145; H04L 2463/144; G06F 21/552
USPC ............................................ 726/24; 713/188
See application file for complete search history.

(56) References Cited

U.S. PATENT DOCUMENTS

| | | |
|---|---|---|
| 7,730,521 B1 | 6/2010 | Thesayi et al. |
| 8,042,186 B1 | 10/2011 | Polyakov et al. |
| 8,191,147 B1 | 5/2012 | Gardner et al. |
| 2006/0075468 A1 | 4/2006 | Boney et al. |
| 2006/0075490 A1 | 4/2006 | Boney et al. |
| 2006/0075494 A1 | 4/2006 | Bertman et al. |
| 2006/0075500 A1 | 4/2006 | Bertman et al. |
| 2009/0198651 A1 | 8/2009 | Shiffer et al. |
| 2009/0198670 A1 | 8/2009 | Shiffer et al. |
| 2009/0265786 A1 | 10/2009 | Xie et al. |
| 2009/0287653 A1 | 11/2009 | Bennett |
| 2010/0169476 A1 | 7/2010 | Chandrashekar et al. |
| 2011/0145920 A1 | 6/2011 | Mahaffey et al. |
| 2011/0153811 A1 | 6/2011 | Jeong et al. |

(Continued)

OTHER PUBLICATIONS

"Luckycat Redux Inside an APT Campaign with Multiple Targets in India and Japan" Trend Micro Research Paper Mar. 2012, 26 pages.*

(Continued)

*Primary Examiner* — Michael Pyzocha
(74) *Attorney, Agent, or Firm* — CipherLaw

(57) ABSTRACT

An automated malware analysis method is disclosed which can perform receiving a first universal resource locator identifying a first intermediate network node, accessing the first intermediate network node to retrieve a first malware artifact file, storing the malware artifact file in a data storage device, analyzing the malware artifact file to identify a second universal resource locator within the malware artifact file, and accessing a second intermediate network node to retrieve a second malware artifact file.

20 Claims, 7 Drawing Sheets

(56) References Cited

U.S. PATENT DOCUMENTS

| | | | |
|---|---|---|---|
| 2011/0154489 A1 | 6/2011 | Jeong et al. |
| 2011/0202997 A1 | 8/2011 | Chandrashekar et al. |
| 2011/0219238 A1 | 9/2011 | Gassoway |
| 2011/0239300 A1 | 9/2011 | Klein et al. |
| 2011/0258702 A1 | 10/2011 | Olney et al. |
| 2011/0302656 A1 | 12/2011 | El-Moussa |
| 2012/0030750 A1 | 2/2012 | Bhargava et al. |
| 2012/0110174 A1 | 5/2012 | Wootton et al. |
| 2012/0151033 A1 | 6/2012 | Baliga et al. |
| 2012/0204264 A1 | 8/2012 | Jiang |

OTHER PUBLICATIONS

Freiling, Felix et al., "Botnet Tracking: Exploring a Root-Cause Methodology to Prevent Distributed Denial-of-Serice Attacks", ESORICS 2005, LNCS 3679, pp. 319-335, 2005.

Dittrich, David et al., "P2P as botnet command and control: a deeper insight", 2008 IEEE, pp. 41-48.

Gu, Guofei et al., "BotSniffer: Detecting Botnet Command and Control Channels in Network Traffic" Proceedings of the 15th Annual Network and Distributed System Security Symposium (NDSS'08), 2008, pp. 1-18.

Malin, Cameron et al., "Malware Forensics: Investigating and Analyzing Malicious Code", Jun. 30, 2008, Syngress, pp. 1-592.

Office Action and PTO-892, Jun. 15, 2012, in U.S. Appl. No. 13/434,311.

Notice of Allowability and PTO-892, Sept. 6, 2012, in U.S. Appl. No. 13/434,311.

Joe Stewart, HTran and the Advanced Persistent Threat |Dell SecureWorks, Aug. 3, 2011, pp. 1-3.

Joe Stewart, The Sin Digoo Affair | Dell SecureWorks, Feb. 29, 2012, pp. 1-10.

* cited by examiner

SYSTEMS AND METHODS FOR AUTOMATED MALWARE ARTIFACT RETRIEVAL AND ANALYSIS

CROSS-REFERENCE TO RELATED APPLICATIONS

This application is a continuation of and hereby claims priority to U.S. application Ser. No. 13/434,311, filed on Mar. 29, 2012, entitled "Systems and Methods for Automated Malware Artifact Retrieval and Analysis," the contents of which are hereby incorporated by reference.

FIELD OF THE INVENTION

The present invention relates generally to techniques for monitoring and collecting information, such as malicious code, execution instructions, and exfiltrated files, and more particularly, to collecting such information as found on publicly accessible network resources.

BACKGROUND OF THE INVENTION

The techniques described in this section are techniques that could be used, but not necessarily approaches that have been previously conceived or used. Therefore, unless otherwise indicated, it should not be assumed that any of the approaches described in this section qualify as prior art merely by virtue of their inclusion in this section.

Network operators are faced with the growing problem of unauthorized access to network resources. Attackers can install malicious software, or malware, on a victim's computing device and use that software to send (exfiltrate) proprietary and confidential data out of the network to third-parties.

Malware, broadly defined, is class of software including a wide variety of hostile, intrusive or annoying forms of computer code. Malware can be, for example, a computer program designed to infiltrate a computing device without the device owner's knowledge or consent. For example, malware can include viruses, worms, Trojan horses (Trojans), rootkits, spyware, adware, and any other unwanted software. Malware can also include modifications to existing program code as well as new program code added into an existing code base. Some types of malware can, for example, collect personal and confidential information related to a user and send this information to another party. Other types of malware can control a system by executing commands as well as exfiltrating data. Still other types of malware may cause a computing device to function poorly, fail to meet quality of service standards, or to not function at all. Malware attacks that impair functionality are considered to be denial of service (DoS) attacks. These are only a few examples of what malware can be and what malware can do.

Network operators routinely employ various intrusion detection, anti-virus, and network security products and techniques to combat the problem. Many of these products and techniques operate by inspecting network traffic for malware signatures and known malware data patterns. Most of these products and techniques are operated by network operators from within their own private networks. These systems are not designed to provide intelligence on the malware. Rather, they are designed to alert network operators to potential or actual attacks on their own systems.

The authors of malware are continuously trying to stay ahead of the network operators. Often, attackers use a waypoint located on a third party network resource, called a command and control (C2) node, to assist in communication with the malware on a victim's computing device. Additionally, attackers also use certain C2 nodes as repositories of their malware. These C2 nodes may also be used to receive exfiltrated data from the victim's environment. The C2 nodes employed by attackers are usually logically separate from the victim computing device, and may also be geographically remotely located. Inspection of the activity of these C2 nodes involves accessing them individually and evaluating their operation.

One of the techniques used by malware to defeat network security is to make the communication protocol between the malware and the C2 node blend in with typical user Internet surfing behavior such as requesting Uniform Resource Locators (URLs) on the Internet. The URLs that the malware requests can contain benign information as well as information that can be used to control the behavior of the malware on the victim's computer. In many cases, portions of the malware communications are intentionally obfuscated in an effort to conceal them from evaluation by a casual observer, even if their presence is detected.

There are several families of malware that use C2 nodes as communications waypoints. Some of this malware is classified as Trojans. The Trojan resident on a victim computer can be configured to look for instructions in the data of a URL, such as where to go to download another file (a second URL), or can be configured to create a remote shell session with an IP address controlled by the attacker.

The amount of malware using C2 nodes is increasing rapidly. Additionally, individual malicious files on victim computing devices may communicate with an arbitrary number of URLs on an arbitrary number of C2 nodes. Thus, as the number of victim computing devices compromised with malware increases, the number of C2 nodes generally also increases. Additionally, malware can utilize Dynamic Domain Name Services (DDNS) to create additional hostnames corresponding to a given C2 node, and vice versa, to resolve the same DDNS domain to various Internet Protocol (IP) addresses (e.g., C2 nodes). This effectively increases the number of URLs that are to be investigated. As a result, it is not practical for an individual malware investigator to manually inspect, explore or evaluate the operations of even a fraction of the number of operational malware C2 nodes. Furthermore, as described above, some of the communications between the malware and the C2 node may be obfuscated. Decoding and decrypting this information adds to the time and effort required to evaluate the operations of malware on C2 nodes.

DETAILED DESCRIPTION

Figure 1:
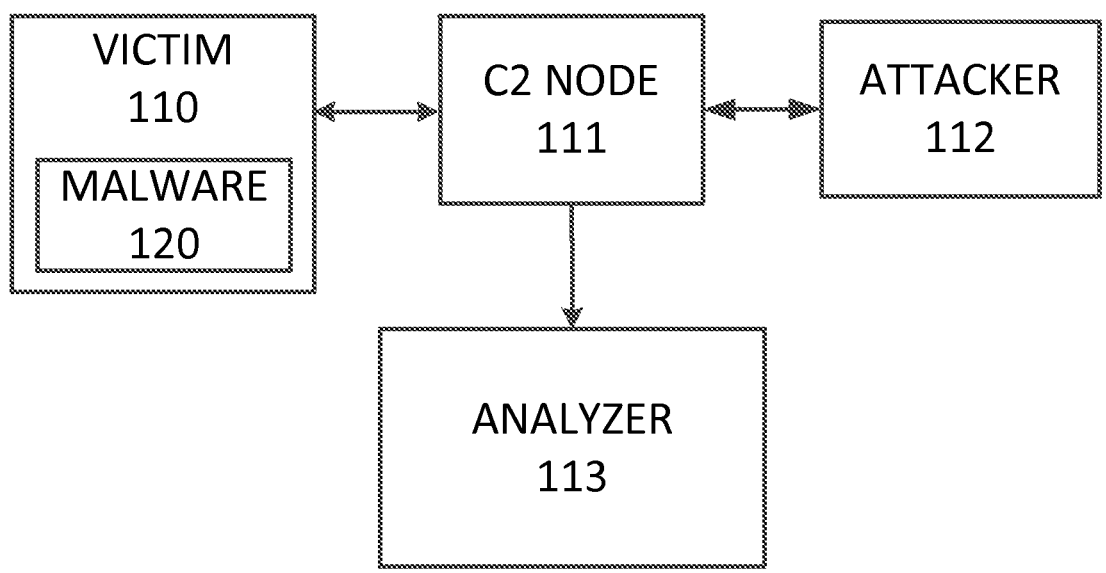
FIG. 1 illustrates an example relationship between the victim, attacker, command and control node, and analyzer module.

In the following description of embodiments, reference is made to the accompanying drawings which form a part hereof, and in which it is shown by way of illustration specific embodiments of claimed subject matter. It is to be understood that other embodiments may be used, for example, and changes or alterations, such as structural changes, may be made. All embodiments, changes or alterations are not departures from scope with respect to intended claimed subject matter.

The systems and methods described herein can be configured to collect data that contain malware artifacts. As non-limiting examples, as used herein, a malware artifact can be any malicious file, or program code that is capable of controlling the execution of malware, as well as data that is being exfiltrated by an attacker. For example, malware artifacts can include program code (including, for example, object code, binaries, or interpretable code) that controls the behavior of a Trojan. Malware artifacts can also include any part of a malware or data resulting from execution of malware. Malware artifacts can include any recorded evidence of an attacker's activities at a target resource, such as documents, logs, etc. As used herein, the term data can refer to any machine readable information, including program code, instructions, user files, URLs, etc., without limitation.

Some embodiments of the invention can be configured to operate in an environment in which the malware resides on a target resource associated with the victim. The target resource can exist on a victim computing device and can be any type of computer, or computing device, including virtual machines. As such, the target resource can be any computing device on any network without limitation. For example, it could be a web server, user terminal, host computer, router, switch, or any other host or server computer. The target resource could be a data storage device, such as network attached storage (NAS). The target resource need not be physically or logically remote from the attacker or C2 node. The target resource can be intermediate between the attacker computing device and the victim computing device. The target resource can be any component of the victim's computing device. The victim computing device, C2 node, and attacker computing device may be in communication though any combination of public and/or private networks.

The systems and methods described herein can operate on any type of computing device. For example, any of the components could be operating on a mobile device. For example, the victim's computing device could be a mobile device, such as a mobile phone or tablet. Likewise, the C2 node could be resident on a mobile device, as could the attacker or analyzer module.

The systems and methods described herein may be used to investigate various types of malware including, for example, advanced persistent threats (APTs) and other types of attacks. The files analyzed by the system can be made available for review though a web interface and accessed on one or more desktop or mobile devices. The systems and methods described herein can be used to provide intelligence on malware operations on a very large scale.

In the following detailed description, the functionality of an automated malware analyzer is described first, followed by a description of an automated workflow processing system incorporating an analyzer.

Automated Analyzer

In many cases, malware communicates with an intermediate network resource, such as a C2 node, which may be a publicly accessible server. The C2 node may be accessible through a uniform resource locator (URL) which may be known to a malware investigator. If the network address of the C2 node is known, a malware investigator can monitor the data transfer between the victim and the attacker by inspecting malware artifacts found on the C2 node. In some cases, the C2 node contains only files uploaded by an attacker computing device or only files uploaded by a victim computing device. In other cases, the C2 node may contain both types of files.

Depending on the legal environment, accessing of the C2 node by an outside malware investigator as described herein may be performed in compliance with the applicable laws, such as the Computer Fraud and Abuse Act or laws and regulations governing authorized and/or unauthorized third-party (e.g., non-owner) access to computer systems. The systems and methods described herein can be configured to operate such that accessing the C2 node or other nodes and computing devices does not constitute an access without authorization and/or does not exceed authorized access.

With reference to FIG. 1, malware 120 may be resident on victim computing device 110 so that victim computing device 110 has been compromised by the introduction of malware 120. The malware 120 on victim computing device 110 may be in communication with C2 node 111. Attacker computing device 112 may also be in communication with C2 node 111. Attacker computing device 112 may be sending commands to C2 node 111 and C2 node 111 may be serving, or relaying, those commands to malware 120 on victim 110. Victim 110 may then perform arbitrary functions based on those commands. Thus, commands directed towards victim computing device 110 may be, at least temporarily, stored on C2 node 111.

As a result of receiving commands from C2 node 111, the malware 120 on victim computing device 110 may have been configured to transmit data from victim 110 to C2 node 111. As a result, the malware resident on victim 110 may be exfiltrating data to C2 node 111. The C2 node 111 may have been configured to forward some or all of the received exfiltrated data to attacker computing device 112. Thus, data being exfiltrated from victim computing device 110 is stored, at least temporarily, on C2 node 111.

The data and commands present on C2 node 111 may be stored as files in a file system, such as UNIX, Linux, Windows, MacOS, iOS, or Android, etc. on the C2 node. As used herein, a file can be any block of arbitrary information or data readable by a processor and stored in a memory device or other type of data store.

The data and commands stored in one or more files on a C2 node may contain one or more URLs. The terms uniform resource locator (URL), universal resource locator (URL), and uniform resource identifier (URI) are used interchangeably herein to refer to a character string constituting a reference to an Internet resource. The URL may identify a host computing device and/or a specific file or directory of files on a computing device. The instructions or commands that are contained in the data of the aforementioned URLs may have been intentionally rendered unreadable by casual human inspection by an obfuscating transformation performed by the malware author. Malware typically obfuscates data by encoding and/or encrypting it using either standard or non-standard algorithms.

In some embodiments, analyzer 113 can be configured to monitor files found at a certain URL on a C2 node to discover additional URLs. An additional URL that is found in a file on the C2 node can be used for further analysis by, in turn, fetching any files that may be available at the additional URL, processing the files retrieved and any data or commands which may be found in the files, and storing the fetched data and commands in an electronic data store. Any suitable electronic data store could be used, including relational databases. If the retrieved data or commands are obfuscated, analyzer 113 may be used to decode or decrypt the data.

An example implementation of this process is described below with reference to the illustration in FIG. 2. Any and all of the following steps can be performed by one or more computerized processing functions in analyzer 113, as illustrated in FIG. 1. Other implementations and designs for performing these steps are possible without departing from the scope and spirit of the invention.

In step 210, an initial set of URLs or a single URL can be provided to the system through URL store 215. The URLs can be entered into URL store 215 manually (as may be the case when the system is first started), or they may be loaded from a file, or input to the system by any other manual or batch process. URLs for investigation can be collected and stored in a URL store 215. In operation, as the system discovers new URLs (for example, possibly embedded in the downloaded Trojans or in the captured commands), those new URLs can also be saved in URL store 215 for subsequent fetch and analysis, as described below. URL store 215 may be physically or logically incorporated into data store 245, or it may be contained in a separate data store.

In step 220, the system fetches one or more files available at the specified URL. Fetching of a URL can be performed automatically or manually. If fetching is performed automatically, the system can automatically and repeatedly fetch the file or files available at that URL and the system can operate on a predetermined frequency and or programmed frequency with which the URL should be accessed. An administrator can configure the frequency and timing parameters for the fetch process and thereby specify a schedule for accessing the specified URL. The system can also operate based on predefined rules for what action to take upon either a failure to locate a specific file or a successful file retrieval from the URL. In step 220, when a file at a URL is fetched, the retrieved file and any associated log data can be stored, in step 240, in data store 245.

In step 225, the system can analyze the file(s) retrieved from the URL. The analyzer can be configured to determine whether any portion of the fetched file(s) contains obfuscated data and/or commands or plain data and commands. If the file is not obfuscated, it can be interpreted in step 230.

If the file is determined to be obfuscated in step 225, the analyzer can apply the appropriate algorithm in step 235 to the data in order to decode it. The determination of which algorithm is used to obfuscate the data, and therefore how it can be decoded (e.g., de-obfuscated), is made by analyzing the file retrieved. In some cases, decoding the file may further include decryption. The decoded file can then be interpreted in step 230.

Many individual instances of malware have certain similarities and, therefore, can be considered to belong to a family of malware. For example, a given family of malware may use a certain algorithm for encrypting data which is reused across a large number of malware instances. For example, if a common obfuscating algorithm used in a malware family, once the obfuscating algorithm has been determined, the deobfuscating algorithm may be reused in the same or substantially the same form unless the obfuscating algorithm is subsequently changed. Thus, the algorithms used for analysis of certain malware may be reused on other instances of malware which share the previously analyzed characteristic.

In step 230, the file can be interpreted by analyzer 113. The files input to the interpret function may be of different types and different algorithms can be implemented to determine subsequent processing steps. The analyzer can be programmed to interpret any arbitrary type of file. If the file contains a URL, the URL can be stored in URL store 215. Other types of files, including user data, program code, etc. can be stored in a data store in step 240. Additional details concerning the function of the interpret file step 230 are described below and with reference to FIG. 3.

Figure 2:
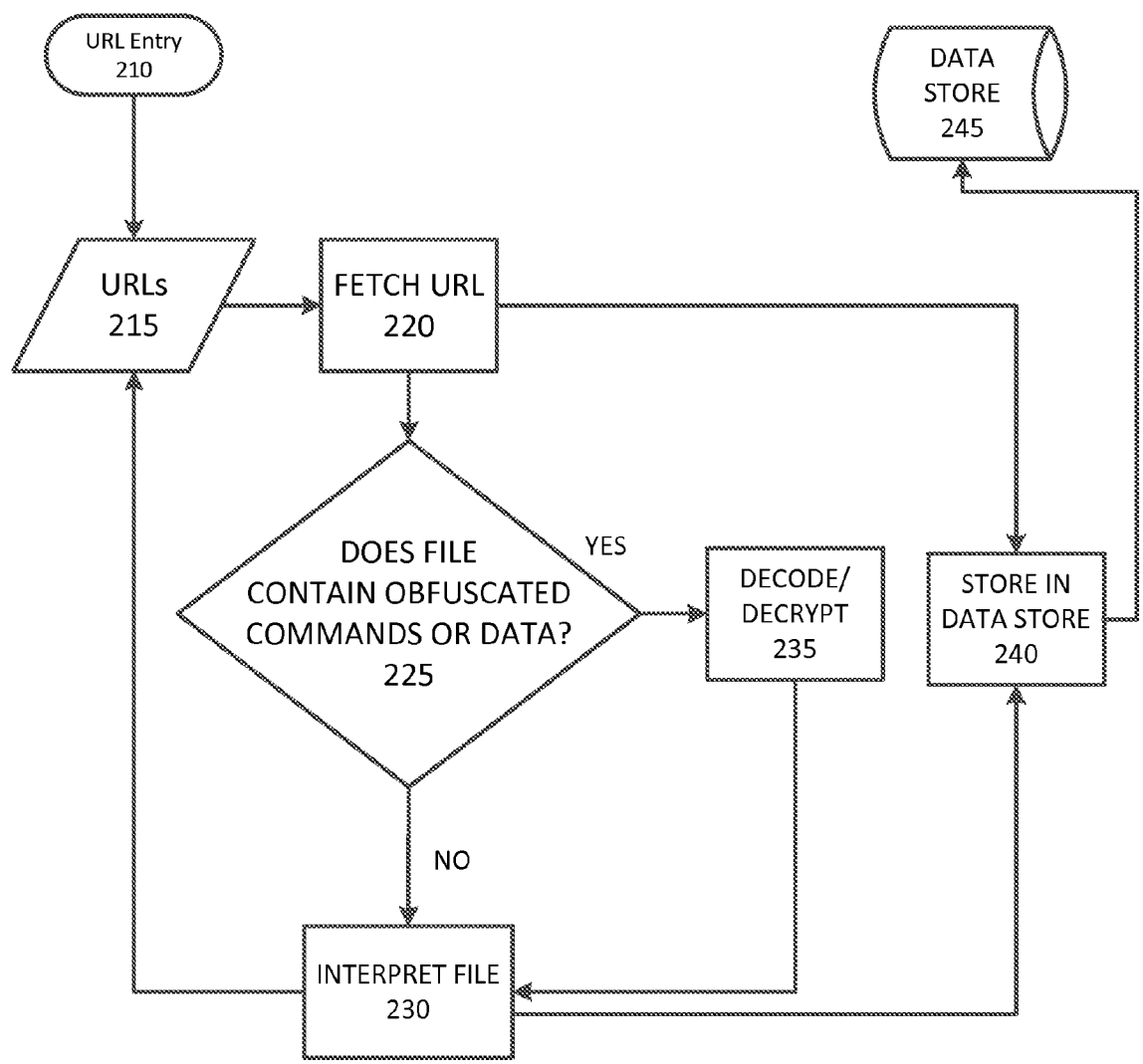
FIG. 2 illustrates an example process flow for retrieving a malware artifact accessible at a specified Universal Resource Locator.

After interpretation in step 230, the file can be stored in a data store, such as data store 245 in step 240, as illustrated in FIG. 2. Once a file has been stored in the data store, it can be made available for various queries. For example, a search interface can be provided to allow a user to perform an electronic search for a known malware filename. As non-limiting examples, the search can be based on literal filename matches, pattern matching, regular expressions, file extensions, and/or the length of the filename (such as 1, 2, or 3 character filenames). As non-limiting examples of search types, a search query could be submitted to the data store to query for a URL including a certain filename or to search the database for data in exfiltrated user files which have been stored.

Figure 3:
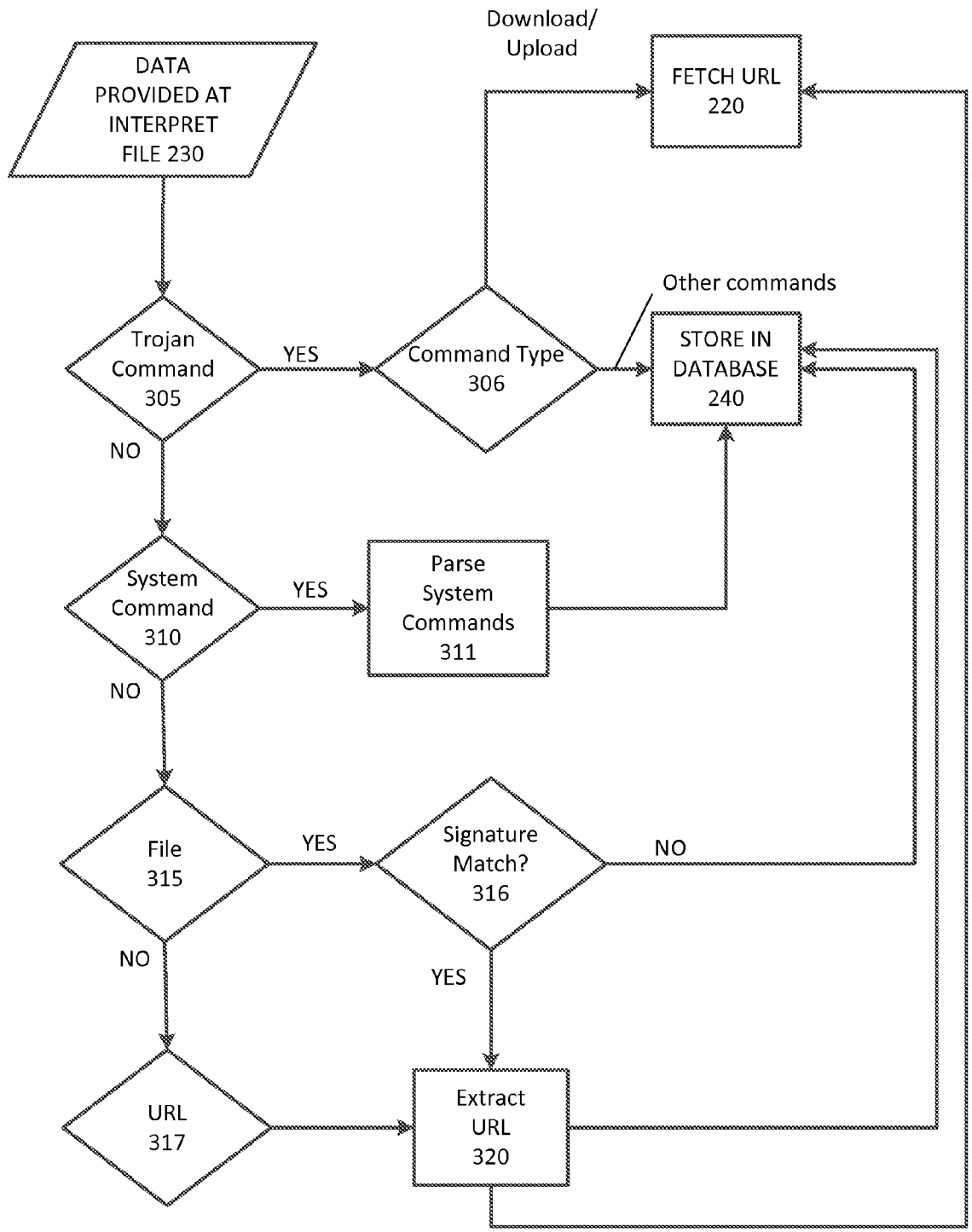
FIG. 3 illustrates an example process flow for analyzing data retrieved from a command and control node.

With reference to FIG. 3, example types of data that the interpret file function 230 can process are presented. The analyzer 113 can be configured to perform functions in step 230 to interpret the files provided to it and determine what type of information is contained in the file. As non-limiting examples, the interpreter can be configured to discern a Trojan command (305), a system command (310), a file (315), and a URL (317). The analyzer described herein can be configured to monitor various different types of malware artifacts, including a variety of Trojans. As non-limiting examples, some of the types of malware that can be monitored include command capture, downloader, and relevant URLs.

Trojan Command (305)

This type of malware operates at victim computing device 110 by requesting a URL located on C2 node 111 that identifies one or more files containing commands issued by the attacker to be executed by the victim. As a result of monitoring activity by the malware and/or the commands on the C2 node, secondary URLs can be derived that can be fed back into the analyzer 113. The secondary URLs can identify the locations of additional malware tools, Trojans, and other types of malware, as well as user data being exfiltrated. The URLs may be provided to URL store 215 for future retrieval and processing.

If a URL specified in a captured command identifies the location of a malicious file, the malware can be downloaded from that location and passed to analyzer 113 which can parse it to determine if the malware can be further monitored. If the malware can be further monitored, the analyzer 113 can automatically extract its URL and perform the analytical processes described herein.

In case of a Trojan command, the Trojan at the victim computing device 110 is typically instructed to perform any of actions (a)-(c), as described below. Possible malware action (a): Fetch a URL from a remote server. In this case, in step 306, the analyzer 113 can determine if the command is to download a file. If the command is to download a file, the analyzer can fetch the designated files at the designated URL, in step 220, and processes the retrieved data as described herein. Possible malware action (b): Upload a file. In this case, in step 306, the analyzer 113 can determine if the command is to upload a file. If the command is to upload a file, the analyzer can fetch the files being uploaded by the victim computing device at the designated URL, in step 220, and processes the retrieved data as described herein. In this case, the analyzer 113 can use logic and programmed file request timing to increase the amount of data uploaded by the victim computing device to the C2 node that can be retrieved by the analyzer. Possible malware action (c): Establish a remote shell with another C2 node. In this case, the analyzer 113 can store the C2 node Internet Protocol address and/or port specified in the command in data store 245 by step 240, as illustrated in FIG. 2.

System Command (310)

In this case, analyzer 113 is configured to receive a system command that the attacker computing device 112 is sending to the Trojan at the victim computing device 110 via the C2 node 111. Generally, the command will be executed on the victim computing device 110. The commands are typically stored in files on the C2 node 111. The files could include both correct and incorrect commands, e.g., typos, sent by the attacker 112. The analyzer 113 can be configured to attempt to parse the command to the extent possible in step 311 and catalog the command itself as well as the arguments passed to it. The results of the parsing can be stored in data store 245 by step 240, as illustrated in FIG. 3. Some of the types of information which may be collected by parsing the command are: (a) victim time zone information, (b) victim compromised passwords, (c) attacker passwords, and/or (d) arguments attackers may pass to their Trojans.

The monitoring process performed by analyzer 113 may capture new malware artifacts, files, and/or Trojans. These files may contain additional encoded URLs identifying instructions that the Trojan can decode and act upon. In some cases, the additional URL may identify another Trojan, which may or may not be obfuscated.

File (315)

The analyzer 113 can include a set of signatures used to analyze retrieved files. In this case, if the downloaded file contains binary data (e.g., a compiled file or object code) it can be compared against a set of Trojan signatures. If the binary data matches one of the signatures in step 316, and if the identified Trojan is of a family that can be monitored, the analyzer 113 can automatically extract the relevant URL from the Trojan in step 320 and store it in data store in step 240, as illustrated in FIG. 3, so that files at the URL may be monitored. If the downloaded file does not contain binary data, it can also be compared against a set of non-Trojan signatures in step 316, and if the identified Trojan is of a family that can be monitored, the analyzer 113 can automatically extract the relevant URL from the Trojan in step 320 and store it in data store in step 240, as illustrated in FIG. 3, so that files at the URL may be monitored. As non-limiting examples, other file categories detected and stored can include exfiltrated data from victim computing devices and log files. Any URLs identified in the files may be provided to URL store 215 for future retrieval and processing.

Figure 4:
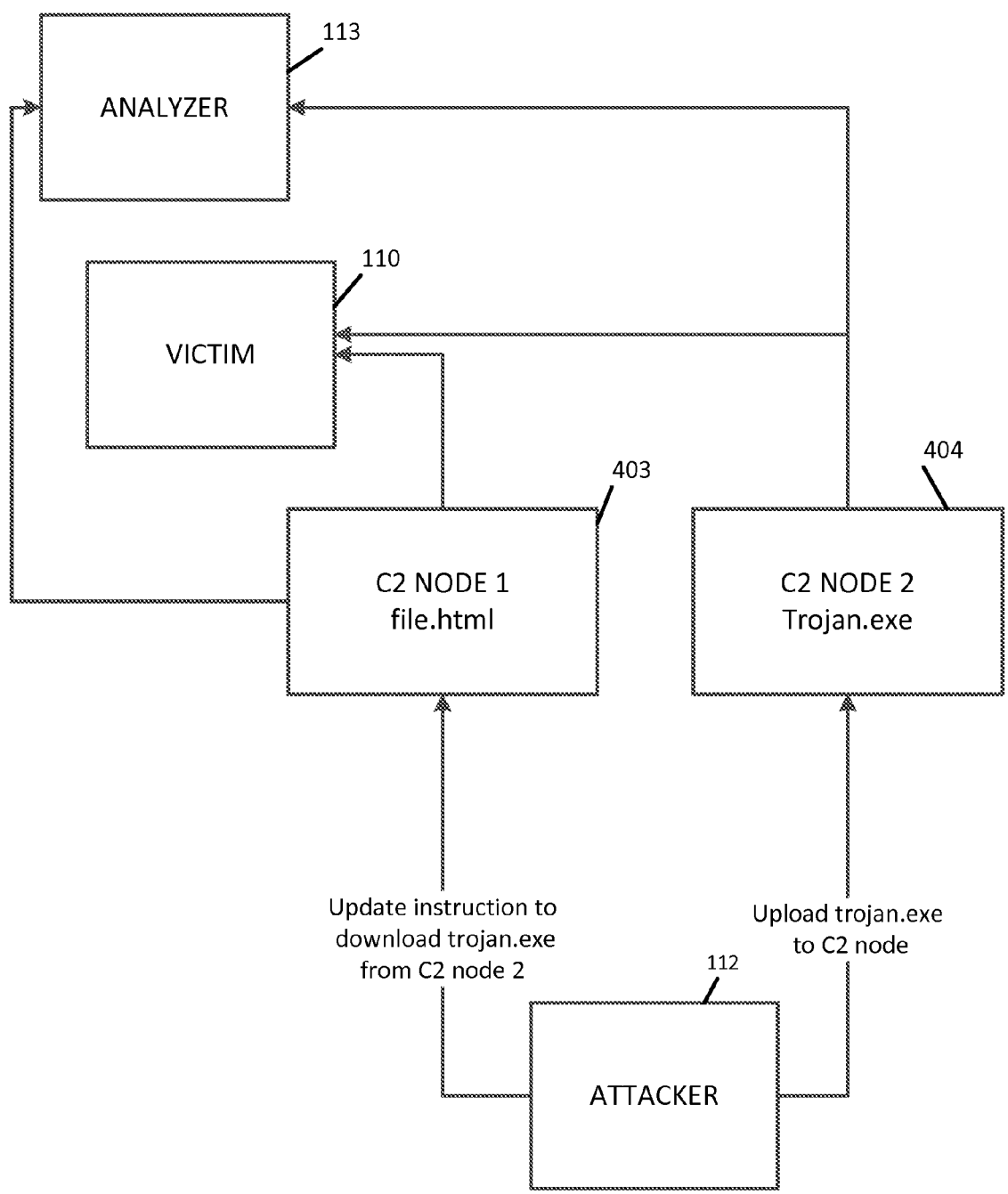
FIG. 4 illustrates an example process flow for obtaining malware artifacts from command and control nodes.

A downloader, for example, is a type of malware that operates on files. An example of this type of malware is graphically represented in FIG. 4. This type of malware requests URLs that contain instructions for the malware to download a file from a second URL. For example, "file.html" at C2 Node 1 403 can contain an instruction for the victim computing device 110 to access an additional malicious file ("Trojan.exe") at C2 Node 2 404. The file at the second URL could be any arbitrary additional malicious file. In the example illustrated, C2 Node 2 404 is configured to provide an executable Trojan to victim 110. Other variations are possible.

When monitoring a downloader URL, the analyzer 113 can be configured to look for additional malware. The malware may be obfuscated. The analyzer 113 can parse the malware to determine if the malware can be monitored. If so, analyzer 113 can be configured to automatically extract its URL and feed it back to the system for further processing as described herein. If the instruction provided at the URL is not to download anything but rather an instruction to send a remote shell to a specified Internet Protocol address, the system can log the instruction for future analysis.

Url (317)

This type of monitoring involves a URL that an attacker may use to serve malware or other Trojans or when data is being exfiltrated. This URL may be a known URL that has been identified while monitoring attacker commands. In some embodiments, these URLs may be monitored for new files with high frequency according to programmatic control.

In other embodiments, target URLs can be generated by the analyzer 113 based on past patterns of attacker behavior. In some situations, a C2 node may have been identified, but it may not be possible for the analyzer to see some or all of the commands that are being sent to the victim computing device and/or victim files that are being uploaded to the C2 node. Nonetheless, an attacker may be instructing a victim to download and/or upload a file to the known C2 node. Given a known C2 node, the analyzer 113 can attempt to predict a complete URL path for a file that is being transferred through the C2 node. For example, it may be known that the computer at "http://www.host.com/" is hosting malware or exfiltrated data, but the specific file name on host.com is not known. In that case, the analyzer could make one or more predictions of possible file names and/or locations. For example, the analyzer could try to access a file at "http://www.host.com/xfer2.zip" where xfer2.zip represents the portion of the URL that has been predicted.

The analyzer can be programmed to use various methods to predict the complete URL path for possible files. In some embodiments, the analyzer can generate a URL prediction based on one or more URLs existing in data store 245. Analyzer can be configured to generate predictions based on dictionary or non-dictionary based systems. As non-limiting examples, genetic algorithms, artificial intelligence, and search algorithms could also be used alone or in combination to predict a complete URL. In some embodiments, the analyzer can be configured to retrieve a malware command from a data store file hosted on the C2 node via a web form.

The analyzer can also be programmed to predict the IP address at which a C2 node may be found. As a non-limiting example, a C2 node may be known to be operational at an IP address of 172.16.0.0. In that example, the analyzer could be configured to attempt to access a malware artifact which may be found on nodes having IP addresses in the range of 172.16.0.0 to 172.16.0.255. Predictions of IP addresses may be made based on subnet boundaries, arbitrary boundaries received from user input, or historical information accessible to the analyzer relating to which IP addresses or ranges of IP addresses have been used for C2 nodes in the past. The historical information may be acquired by the analyzer based on previous analyses of known C2 nodes.

The analyzer can be configured to use IP address prediction in combination with file name predictions, as described herein, so that the analyzer can predict a complete host IP address and file path. While some of the examples provided herein use IPv4 addresses and/or private addresses, the analyzer can be configured to use any combination of IPv4, IPv6, public and/or private addresses.

The analyzer can also be configured to use domain name information to predict IP addresses and/or hostnames for additional C2 nodes. As a non-limiting example, a known C2 node may have a WHOIS record containing certain information related to that domain name or IP address. The analyzer can access the WHOIS record for the C2 node and obtain domain name registration information and other recorded information for the domain name or IP address in question. The analyzer can be configured to then search for other WHOIS records which match predetermined characteristics of the WHOIS record for the known C2 node. The analyzer can then parse the matching WHOIS record to identify an additional IP address or host name for further analysis.

The following are non-limiting examples of processing steps that the analyzer can be configured to execute to analyze a malware artifact:

The analyzer can be configured to interpret a command stored in an HTML file. If the command string is obfuscated by having been converted into ASCII hex, the obfuscation can be reversed by the analyzer. In some embodiments, the analyzer can be configured to interpret a command encoded using standard Base64.

The analyzer can be configured to interpret an encoded command from an HTML file that is Base64 encoded with a custom alphabet. The analyzer can be configured to interpret an encoded or scrambled custom alphabet based on a specified integer. In some cases, the specified integer may be a random integer. As a non-limiting example, the analyzer can be configured to parse a command having a format of: < . . . sb="INSTRUCTION(RANDOM NUM)"</ . . . > or < . . . ex="EXECUTABLE(RANDOM NUM)"</ . . . >.

The analyzer can be configured to interpret a Base64 encoded instruction by further performing RC4 decryption. As a non-limiting example, the instruction may be of the format: <div safe: INSTRUCTION balance>.

The analyzer can also be configured to interpret a command placed in an HTML tag, for example, <!—INSTRUCTION—!>. The analyzer can be configured to interpret an encoded instruction in the first line of an HTML file. The HTML file may include a standard Base64 encoded instruction in the first line of the file. While the examples described herein are made with reference to Base64, the analyzer could be configured to decode other encoding schemes representing binary data.

The analyzer can be configured to interpret an obfuscated command found at the end of a PNG, JPG, or other type of image file. In some cases, the analyzer can be configured to detect delimiting characters (e.g., "DDDD") in the file. In some cases, a PNG file downloaded by the victim computing device may contain an inverted executable (e.g., XOR-ed with 0xFF), which can be further analyzed and decoded by the analyzer.

Automated Malware Artifact Workflow Processing System

The systems and methods described herein can be incorporated into an automated malware artifact workflow processing and/or monitoring system. The automation of the system will be described first with respect to an example embodiment. The invention is not limited to this embodiment and not all of the steps described need to be performed in all embodiments.

In the first embodiment, the system includes a processing system including programming instructions for receiving user input data, performing various and variable processes based on that data, and providing processed data output to a user. In some embodiments, the programming instructions can be provided and executed through a web application framework. In some embodiments, the framework can be based on Django™. Alternatively, other frameworks can be used. While it may be advantageous to use a web application framework, other types of frameworks may be used. As non-limiting examples, the framework can be provided in languages such as, but not limited to, Django™, Java™ and J2EE™, JavaScript™/AJAX™, ASP.NET™, JSP, PHP, Jscript.NET™, VBscript™, Perl™, VBscript.NET™, Visual Basic™, Ruby on Rails™, Tcl, C++, and/or C#.

The processing system can be in communication with a computerized data storage system. The data storage system can include a data store, such as a MySQL™ or other relational database. The data store may be a database server, such as Microsoft SQL Server™, Oracle™, IBM DB2™, SQLITE™, or any other database software, relational or otherwise. The data store may store the information identifying target resources to be analyzed and any information required to analyze those target resources. In some embodiments, the processing system may use object-oriented programming and may store data in objects. In these embodiments, the processing system may use an object-relational mapper (ORM) to store the data objects in a relational database.

The processing system can utilize one or more task manager or queue. In some embodiments, a distributed task manager, such as Celery, can be used as the task manager. Other task managers could be used. The task manager can be implemented using any tool for managing and distributing processing tasks.

Processing can be performed on any combination of single- or multi-processor environments or single- or multi-threaded environments. Any computing means is capable of operating as the processor. In a multithreaded or multiprocessor environment, the processing can be performed by a processor such as a worker process in a cluster of processors. The processing can be performed on a distributed system.

The framework can be configured to interact with modules, add-ons, or plug-ins having arbitrary functionality. The add-ons or plug-ins can extend the functionality of the framework. In some embodiments, the modules can include functionality directed to specific target resources.

Figure 5A:
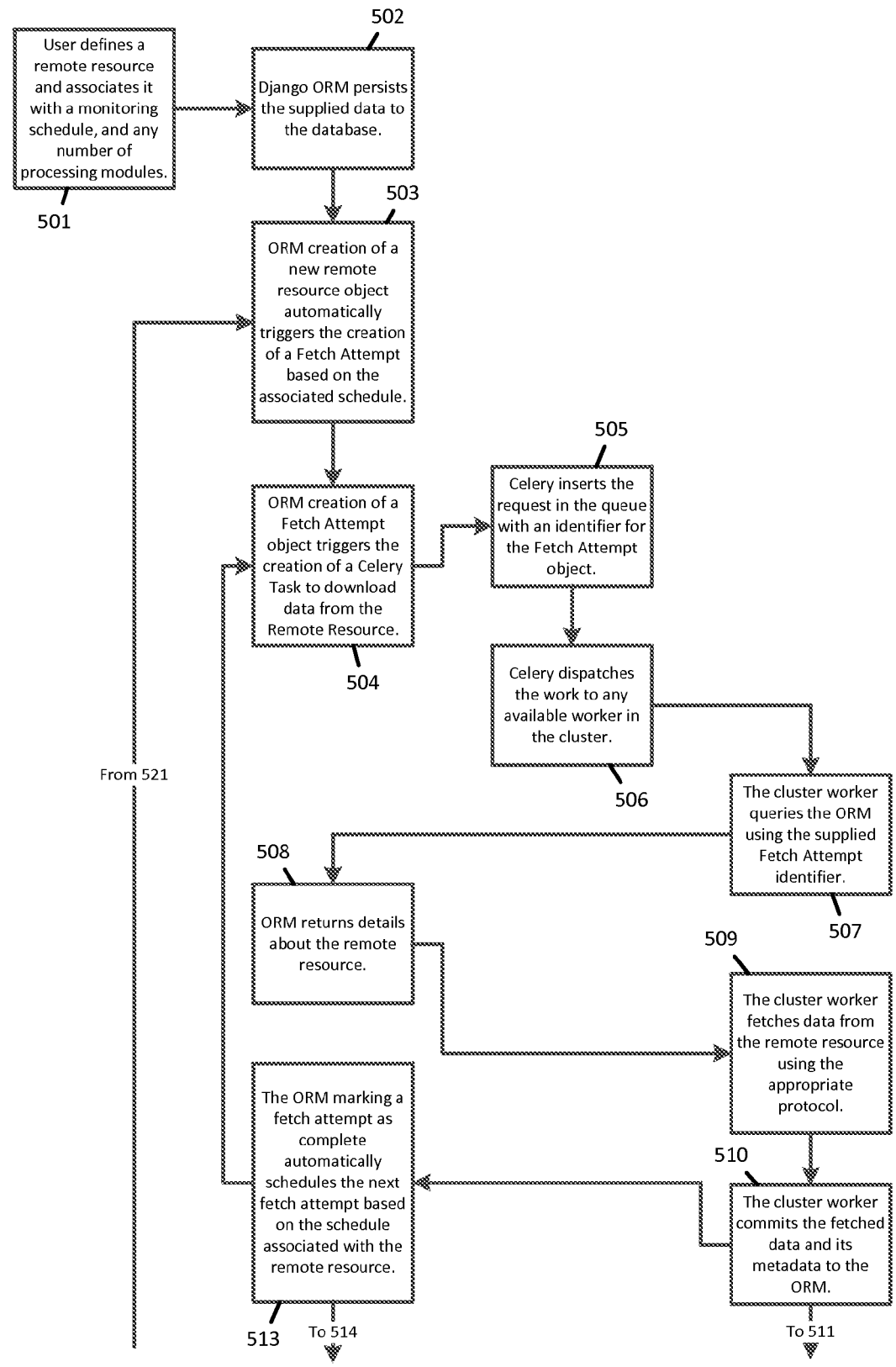
FIGS. 5A and 5B illustrate an example automated workflow process for malware artifact retrieval and analysis.
Figure 5B:
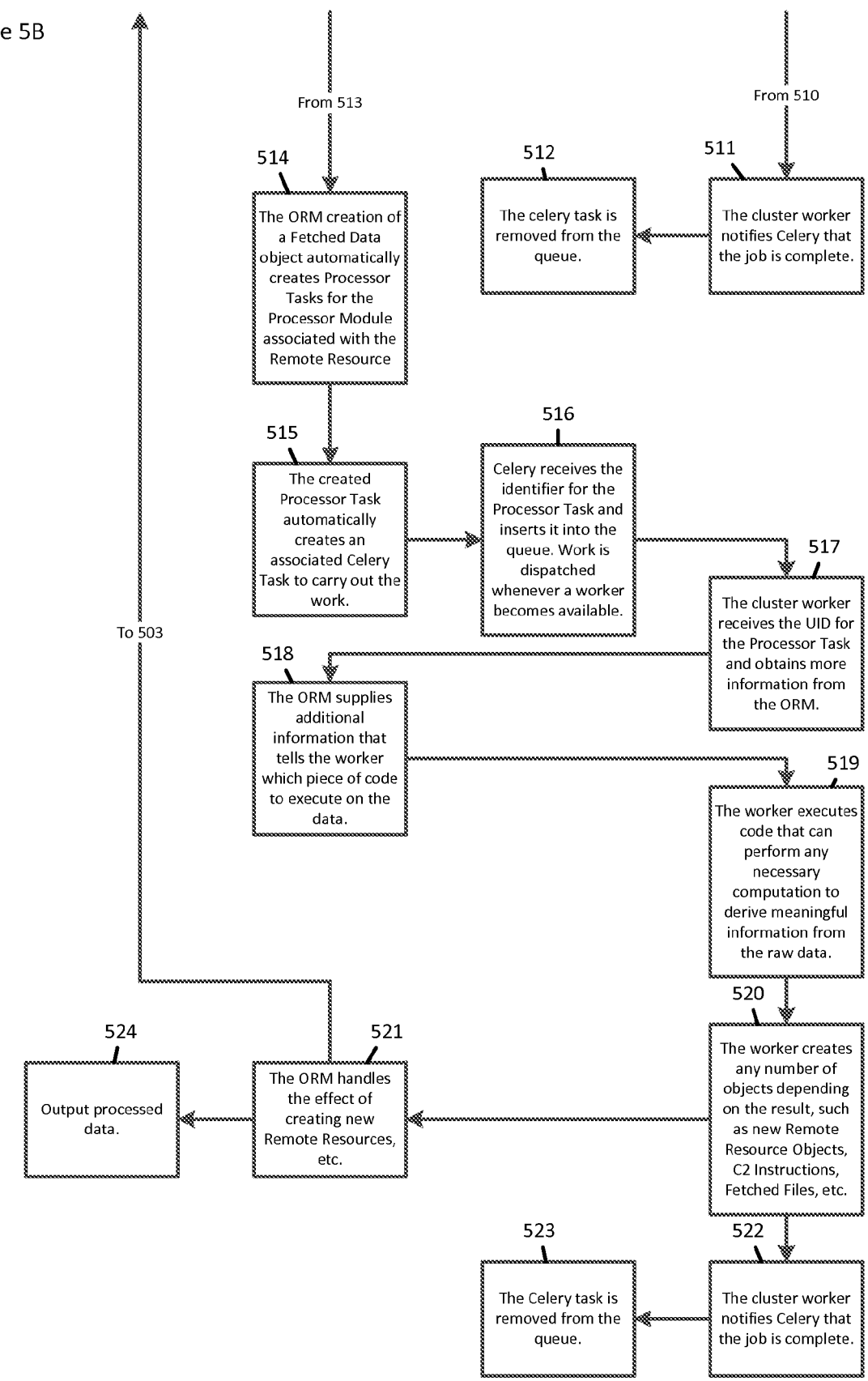

An example automated workflow processing method of a monitoring system is illustrated in FIGS. 5A and 5B and described below with respect to a first embodiment.

Step 501: The user defines a target resource. The target resource can be defined as having various parameters, including a URL, username, password, and target files. Target resources can be defined based on keywords and/or patterns, as well as by static filenames. The target resource can be manually entered by a user or can be automatically or manually imported from a data file of any format. The target resource can include any of the different types of data and files discussed herein. As discussed in more detail below, new target resources can be defined based on the results of analysis of other target resources.

The target resource can be associated with a monitoring schedule and/or any number of processing modules. A processing module can be general and/or special purpose microprocessors, as discussed in more detail below. The monitoring schedule can be a set of times at which the target resource should be monitored. The times can be specific clock times, intervals, or offsets from other times. The monitoring schedule can also be fully or partially randomized, in some embodiments. The schedule can include a single action or multiple repeating actions to be taken on a target resource. The schedule can include an interval, a maximum number of retries, a retry interval, and a value to indicate that the monitoring is to occur on demand only. In some embodiments, the intervals can be computed based on a determination of the success of a previous fetch attempt. For example, a determination of a failure of a previous fetch attempt can result in a relatively longer interval while a determination of a successful previous fetch attempt can result in relatively shorter intervals. The schedule can be implemented by the processing module or by a separate scheduling module.

Step 502: The data received from the user can be stored in a computerized data store. The data store can include one or more databases. The databases could be relational or non-relational, such as NoSQL. In some embodiments, a framework can be used to receive and store the data received from the user. Some of those embodiments could employ a web framework such as Django™ for this purpose. The storage system can be built using any number of available application frameworks or development environments. The framework can include an object-relational mapper which mediates between data models and a relational database. The object-relational mapper can create a new target resource object.

Alternatively, the storage system could be developed independently without using a framework. If a relational database is used, the relational database can be of any structure and derived from any suitable source. In the case of Django™, the Django™ object-relational mapper can persist the supplied data to the data store. At least some of the data from the user can be stored in the data store as a new target resource object. Other data received from the user can be stored in the data store outside of target resource objects.

Step 503: The framework detects the creation of the new target resource object. The creation of the new target resource object can cause the framework to create a fetch attempt object. Creation of the fetch attempt object can automatically begin a fetch attempt for the target resource. The fetch attempt can be based on the schedule provided when the target resource was initially defined. The number of fetch attempts created may be dependent on the number of new target resources having been defined.

Step 504: The creation of the fetch attempt can automatically trigger a new task to download data from the identified target resource. Various tools can be used to handle the one or more fetch attempts. In some embodiments, Celery can be used to handle the fetch attempts. However, any suitable synchronous or asynchronous task queue or job queue manager can be used for this purpose. Triggers can be implemented by inserting hooks into the object relational mapper to perform any arbitrary function, such as create more tasks, etc.

Step 505: The task manager can insert the request for a fetch attempt into a queue. When the fetch attempt is added to the queue, the task manager can generate a unique or substantially unique identifier for the task. The identifier can be stored with or in the fetch attempt object.

Step 506: The task manager can cause the fetch attempt to be processed by an available processor. If Celery is used, Celery can dispatch the fetch attempt to any available processor or worker in the cluster. In embodiments based on a task manager such as Celery, any process could be instantiated as a cluster worker. Information provided to the processor can include the identifier associated with the fetch attempt.

Step 507: The processor can retrieve parameters for the fetch attempt from the data store using the supplied identifier. In some embodiments, the processor can query an object-relational mapper using the supplied identifier.

Step 508: In response to the query, the data store can return the parameters relating to the identified target resource. An object-relational mapper can be used for this purpose, in some embodiments.

Step 509: The processor can access the target resource and retrieve data from it based on the defined parameters. The processor can access the target resource using any appropriate protocol over any available network. As non-limiting examples, the processor could use HTTP, HTTPS, RDP, FTP, SSH, or rsync, etc. over the Internet. Protocols used can be authenticated or un-authenticated. The data retrieved can include the malware artifact.

Step 510: The processor can store the retrieved data in the data store as fetched data. In some embodiments, the retrieved data can include both data and its associated metadata. Metadata can include headers, IP addresses at the target resource, etc. In some embodiments, the data can be stored using an object-relational mapper as a fetched data object accessible to the framework.

Step 511: After the processor has stored the retrieved data, the fetch attempt can be marked as complete. In embodiments employing Celery, a cluster worker can notify Celery that the job is complete. If the fetch attempt explicitly fails or does not reach a complete state, the fetch attempt can be abandoned and re-queued at another time.

Step 512: If a task manager such as Celery is used, the fetch attempt Celery task is removed from the Celery queue.

Step 513: The system can be configured so that the marking of an individual fetch attempt as complete can automatically schedule the next fetch attempt on that target resource. The next attempt can be based on the schedule associated with that target resource, as described herein. In some embodiments, the object-relational mapper can mark the fetch attempt as complete, upon reaching a condition or success or failure for the attempt.

Step 514: The storage of fetched data in the data store can automatically cause the processor to create a data processor task for processing the retrieved data. In some embodiments, data processor modules can be associated with target resources and the creation of a fetched data object by the object-relational mapper can create a data processor task for any processor modules associated with the target resource.

Step 515: In some embodiments, the framework can automatically create an associated task manager task to perform the data processing. In some embodiments using a Django™ framework, the creation of a data processor task can automatically create an associated Celery task to perform the data processing.

Step 516: The task manager receives the unique or substantially unique identifier for the data processing task. The task manager can insert the data processing task into the queue. Work may be dispatched whenever processing capabilities are available. In embodiments based on a task manager such as Celery, any process could be instantiated as a cluster worker. Information provided to the processor can include the identifier associated with the fetch attempt.

Step 517: The processor can receive the identifier from the task manager. Based on the identifier, the processor can obtain additional information about the data processing task from the data store. In some embodiments, a cluster worker can receive the identifier for the data processing task from the object-relational mapper in the framework. The processor can retrieve parameters for the processing from the data store using the supplied unique or substantially unique identifier. In some embodiments, the processor can query an object-relational mapper using the supplied unique or substantially unique identifier.

Step 518: The framework can provide additional information containing, for example, processing instructions and parameters for execution on the retrieved data. This additional information can, for example, be stored in the data store. In some embodiments, the object-relational mapper can retrieve the data. The processing instructions are provided by the processor task.

As discussed herein, different types of malware artifacts can be processed, analyzed, and interpreted using different techniques, as appropriate. The data store can store the additional information concerning the results of the processing.

Step 519: The processor can execute appropriate instructions to process the retrieved data in accordance with the additional information provided by the framework. As non-limiting examples, this processing can include decoding (e.g., deobfuscating and/or decrypting) the retrieved data. This processing can include any of the processing steps described herein.

Step 520: The processor can analyze the processed target resource data and determine if additional new target resources are to be created based on the processed target resource data. The processor can also create process result objects, C2 instruction objects, or any other related object. The new target resources could include, for example, new target resource objects, command and control instructions, fetched files, etc.

Step 521: Information relating to any new target resources can be stored in the data store. In some embodiments, an object-relational mapper can be used to store the new target resources. As a result of storing the information relating to the new target resources, a new fetch attempt can be triggered through the object-relational mapper, using the methods described herein, and the method repeated in whole or in part.

Step 522: After the processor has reached an end state, the job can be marked as complete. In embodiments employing Celery, a cluster worker can notify Celery that the job is complete.

Step 523: If a task manager such as Celery is used, the data processing Celery task is removed from the Celery queue.

Step 524: The system can output a distillation of the processed data. The data can be presented in a web-based user interface. The data can also be sorted or further analyzed.

Second Embodiment

Figure 6:
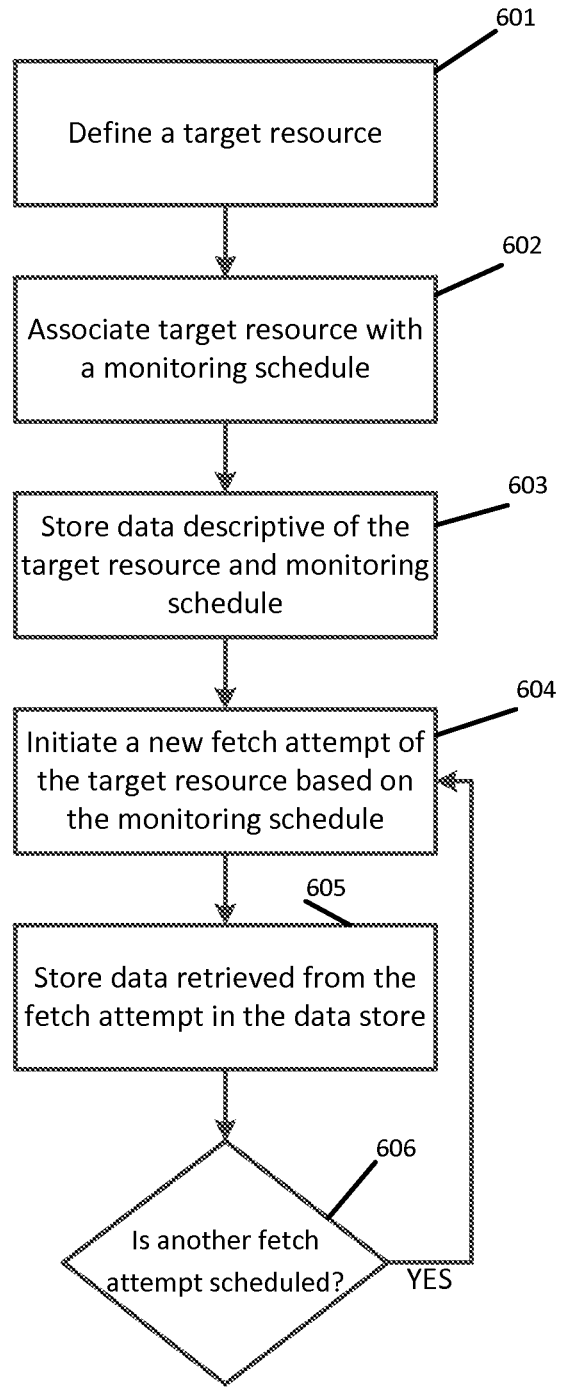
FIG. 6 illustrates an example automated workflow process.

In some embodiments, an alternative version can be implemented. In those embodiments, the processor can be configured to perform include some or all of the following steps, with reference to FIG. 6.

Step 601: Define a target resource having an identified URL. The identified URL can be predicted, as described herein, or known.

Step 602: Associate the target resource with a monitoring schedule.

Step 603: Store data descriptive of the target resource and monitoring schedule in a data store.

Step 604: Initiate a new fetch attempt of the target resource based on the monitoring schedule.

Step 605: Store data retrieved from the fetch attempt in the data store.

Step 606: Determine if another fetch attempt is scheduled. If another fetch attempt is scheduled, perform the next fetch attempt according to the schedule.

System Architectures

The systems and methods described herein can be implemented in software or hardware or any combination thereof.

The methods can be implemented in a computer program product accessible from a computer-usable or computer-readable storage medium providing program code for use by or in connection with a computer or any instruction execution system. A computer-usable or computer-readable storage medium can be any apparatus that can contain or store the program for use by or in connection with the instruction execution system, apparatus, or device. The described features can be implemented in one or more computer program products that are executable on a processing system including at least one programmable processor coupled to receive data and instructions from, and to transmit data and instructions to, a data storage system, at least one input device, and at least one output device.

A data processing system suitable for storing and/or executing the corresponding program code can include at least one processor coupled directly or indirectly to memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer having a display device such as a CRT (cathode ray tube), LCD (liquid crystal display), or other type of monitor for displaying information to the user and a keyboard and an input device, such as a mouse or a trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML etc., or a combination of programming languages, including compiled or interpreted languages, and it can be deployed in any form, including as a stand-alone program or as a module, component, subroutine, or other unit suitable for use in a computing environment. The software can include, but is not limited to firmware, resident software, microcode, etc. Protocols such as SOAP/HTTP may be used in implementing interfaces between programming modules. The components and functionality described herein may be implemented on any desktop operating system such as different versions of Microsoft Windows™, Apple™ Mac™, iOS™, Unix™/X-Windows™, Linux™, etc., executing in a virtualized or non-virtualized environment, using any programming language suitable for desktop software development.

Suitable processors for the execution of a program of instructions include, by way of example, both general and special purpose microprocessors, and the sole processor or one of multiple processors or cores, of any kind of computer. A processor may receive instructions and data from a read-only memory or a random access memory or both. Processor may include any processing circuitry or control circuitry operative to control the operations and performance of an electronic device.

The processor may also include, or be operatively coupled to communicate with, one or more data storage devices for storing data files. Such devices can include, for example, magnetic disks (including internal hard disks and removable disks), magneto-optical disks, optical disks, and/or flash storage. Storage devices suitable for tangibly embodying computer program instructions and data can include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The methods and systems described herein can be implemented using one or more virtual machines operating alone or in combination with each other. Any applicable virtualization solution can be used for encapsulating a physical computing machine platform into a virtual machine that is executed under the control of virtualization software running on a hardware computing platform, or host. The virtual machine can have both virtual system hardware and guest operating system software.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

One or more embodiments of the invention may be practiced with other computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a network.

While one or more embodiments of the present invention have been described, various alterations, additions, permutations and equivalents thereof are included within the scope of the invention.

What is claimed is:

1. A computerized method for automatically intercepting communications passing through a command and control node, comprising:
    receiving a target resource identifier, the target resource identifier specifying:
        an address for a command and control node; and
        a location of a malware artifact electronically stored at the command and control node,
            wherein the malware artifact comprises a command or data being exchanged between an attacker computing device and a victim computing device;
    receiving the malware artifact at an analyzer device separate from the command and control node and the victim computing device;
    determining whether the malware artifact is at least partially obfuscated;
    decoding the malware artifact to reverse at least one obfuscating transformation if the malware artifact is at least partially obfuscated;
    storing the malware artifact in an electronic data store; and
    analyzing the decoded malware artifact at the analyzer device to determine whether it contains a command or data stored therein.

2. The computerized method of claim 1, further comprising:
    repeatedly accessing the command and control node according to a fetch schedule and attempting to retrieve the malware artifact available at the address;
    electronically analyzing the malware artifact to determine a deobfuscation algorithm for the malware artifact;
    decoding the malware artifact to identify a second address within the malware artifact according to the determined deobfuscation algorithm;
    storing the second address in the electronic data store; and
    accessing a second command and control node at the second address to retrieve a second malware artifact.

3. The computerized method of claim 1, further comprising:
    processing the malware artifact to identify a second address identifying a second malware artifact at a second command and control node;
    retrieving the second malware artifact stored at the second command and control node; and
    storing the second malware artifact in the electronic data store.

4. The computerized method of claim 1, further comprising:
    predicting a second address identifying a second malware artifact at a second command and control node, the prediction based on the first address, and wherein the second address identifies a host and a file name; and
    generating the second address based on the prediction.

5. The computerized method of claim 1, wherein:
    the malware artifact is a file uploaded by a victim computing device to the command and control server; and
    the malware artifact comprises data having been exfiltrated from the victim computing device by an attacker.

6. The computerized method of claim 1, wherein the malware artifact comprises one or more commands provided by an attacker computing device.

7. The computerized method of claim 6, wherein the command provided by the attacker computing device comprises at least one instruction directed to the victim computing device.

8. The computerized method of claim 1, wherein the malware artifact further comprises program code for controlling execution of malware on the victim computing device.

9. The computerized method of claim 8, wherein the program code comprises an instruction to the victim computing device to upload one or more files to the command and control node.

10. The computerized method of claim 1, wherein the command and control node is in communication with the victim computing device and the attacker computing device.

11. The computerized method of claim 1, wherein the command and control node is a publicly accessible network resource and accessing the command and control node does not legally constitute access without authorization by a third-party.

12. A computerized system for automatically intercepting communications passing through a command and control node, comprising:
    an input module configured for:
        receiving a target resource identifier, the target resource identifier specifying:
            an address for a command and control node; and
            the location of a malware artifact electronically stored at the command and control node, wherein the malware artifact comprises a command or data being exchanged between an attacker computing device and a victim computing device;
    an analyzer module configured for:
        receiving the malware artifact, wherein the analyzer module is separate from the command and control node and the victim computing device;
        determining whether the malware artifact is at least partially obfuscated;
        decoding the malware artifact to reverse at least one obfuscating transformation if the malware artifact is at least partially obfuscated;
        analyzing the decoded malware artifact at the analyzer module to determine whether it contains a command or data stored therein; and
    an electronic data store configured for storing the malware artifact.

13. The computerized system of claim 12, wherein the analyzer module is further configured for:
  repeatedly accessing the command and control node according to a fetch schedule and attempting to retrieve the malware artifact available at the address;
  electronically analyzing the malware artifact to determine a deobfuscation algorithm for the malware artifact;
  decoding the malware artifact to identify a second address within the malware artifact according to the determined deobfuscation algorithm;
  storing the second address in the electronic data store; and
  accessing a second command and control node at the second address to retrieve a second malware artifact.

14. The computerized system of claim 12, wherein the analyzer module is further configured for:
  processing the malware artifact to identify a second address identifying a second malware artifact at a second command and control node;
  retrieving the second malware artifact stored at the second command and control node; and
  storing the second malware artifact in the electronic data store.

15. The computerized system of claim 12, wherein the analyzer module is further configured for:
  predicting a second address identifying a second malware artifact at a second command and control node, the prediction based on the first address, and wherein the second address identifies a host and a file name; and
  generating the second address based on the prediction.

16. The computerized system of claim 12, wherein:
  the malware artifact is a file uploaded by a victim computing device to the command and control server; and
  the malware artifact comprises data having been exfiltrated from a victim computing device by an attacker.

17. The computerized system of claim 12, wherein the malware artifact comprises one or more commands provided by an attacker computing device.

18. The computerized system of claim 17, wherein the command provided by the attacker computing device comprises at least one instruction directed to the victim computing device.

19. The computerized system of claim 12, wherein:
  the malware artifact further comprises program code for controlling execution of malware on the victim computing device; and
  wherein the program code comprises an instruction to the victim computing device to upload one or more files to the command and control node.

20. A non-transitory computer readable storage medium comprising code executable by a processor for performing a method, the method comprising:
  receiving a target resource identifier, the target resource identifier specifying:
    an address for a command and control node; and
    a location of a malware artifact electronically stored at the command and control node,
    wherein the malware artifact comprises a command or data being exchanged between an attacker computing device and a victim computing device;
  receiving the malware artifact at an analyzer device separate from the command and control node and the victim computing device;
  determining whether the malware artifact is at least partially obfuscated;
  decoding the malware artifact to reverse at least one obfuscating transformation if the malware artifact is at least partially obfuscated;
  storing the malware artifact in an electronic data store; and
  analyzing the decoded malware artifact at the analyzer device to determine whether it contains a command or data stored therein.

* * * * *